United States Patent
Gustafsson et al.

(10) Patent No.: US 11,451,625 B2
(45) Date of Patent: Sep. 20, 2022

(54) DEPLOYMENT OF ACTOR INSTANCES

(71) Applicant: Telefonaktiebolaget LM Ericsson (publ), Stockholm (SE)

(72) Inventors: Harald Gustafsson, Lund (SE); Ola Angelsmark, Ystad (SE); Johan Olsson, Kavlinge (SE)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 179 days.

(21) Appl. No.: 16/345,702

(22) PCT Filed: Oct. 31, 2016

(86) PCT No.: PCT/EP2016/076216
§ 371 (c)(1),
(2) Date: Apr. 27, 2019

(87) PCT Pub. No.: WO2018/077440
PCT Pub. Date: May 3, 2018

(65) Prior Publication Data
US 2019/0253486 A1    Aug. 15, 2019

(51) Int. Cl.
*H04L 67/104* (2022.01)
*H04L 67/00* (2022.01)
(Continued)

(52) U.S. Cl.
CPC .......... *H04L 67/104* (2013.01); *H04L 67/10* (2013.01); *H04L 67/34* (2013.01); *H04W 4/70* (2018.02)

(58) Field of Classification Search
CPC ....... H04L 67/104; H04L 67/10; H04L 67/34; H04W 4/70
See application file for complete search history.

(56) References Cited

U.S. PATENT DOCUMENTS

2003/0093717 A1* 5/2003 Mason ................ G06F 11/3684
714/38.1
2008/0275828 A1* 11/2008 Payton ................... G06F 11/30
706/16
(Continued)

FOREIGN PATENT DOCUMENTS

CN    103138397 A    6/2013
CN    103945463 A    7/2014
(Continued)

OTHER PUBLICATIONS

PCT International Search Report, dated Jul. 14, 2017, in connection with International Application No. PCT/EP2016/076216, all pages.
(Continued)

*Primary Examiner* — Benjamin M Thieu
(74) *Attorney, Agent, or Firm* — Leffler Intellectual Property Law, PLLC

(57) ABSTRACT

There is provided mechanisms for initiating deployment of an instance of an actor. A method is performed by a peer runtime environment. The method comprises obtaining an indication of changed dynamic capabilities of a first runtime environment. The method comprises evaluating, based on the changed dynamic capabilities, constraints for actor initiation at the first runtime environment. The method comprises initiating deployment of the instance of the actor at the first runtime environment when the constraints are met.

22 Claims, 6 Drawing Sheets

(51) Int. Cl.
*H04W 4/70* (2018.01)
*H04L 67/10* (2022.01)

(56) References Cited

U.S. PATENT DOCUMENTS

| | | | |
|---|---|---|---|
| 2009/0112966 A1* | 4/2009 | Pogrebinsky | H04L 67/10 709/201 |
| 2011/0276951 A1* | 11/2011 | Jain | G06F 11/3006 717/140 |
| 2013/0297567 A1* | 11/2013 | George | G06F 16/215 707/687 |
| 2014/0278623 A1* | 9/2014 | Martinez | G06Q 10/06 705/7.12 |
| 2015/0268948 A1* | 9/2015 | Plate | G06F 21/577 717/123 |
| 2016/0128043 A1 | 5/2016 | Shuman et al. | |
| 2016/0268948 A1* | 9/2016 | Choi | H02H 7/122 |
| 2016/0352864 A1* | 12/2016 | Stallings | H04L 67/34 |
| 2017/0214694 A1* | 7/2017 | Yan | H04L 41/14 |
| 2017/0257223 A1* | 9/2017 | Persson | H04L 12/1496 |

FOREIGN PATENT DOCUMENTS

| | | |
|---|---|---|
| CN | 103138397 A | 6/2016 |
| WO | 2014015732 A1 | 1/2014 |
| WO | 2015117328 A1 | 8/2015 |

OTHER PUBLICATIONS

PCT Written Opinion, dated Jul. 14, 2017, in connection with International Application No. PCT/EP2016/076216, all pages.
Per Persson et al., "Calvin—Mergind Could and IoT", Procedia Computer Science, 6th International Conference on Ambient Systems, Networks, and Technologies, vol. 52, Jun. 3, 2015, pp. 210-217.
Carl Hewitt, "Actor Model of Computation: Scalable Robust Information Systems", retrieved from the internet: https://pdfs.semanticscholar.org/7626/93415b205b075639fad6670b16e9f72d14cb.pdf, Aug. 9, 2010, pp. 1-75.

* cited by examiner

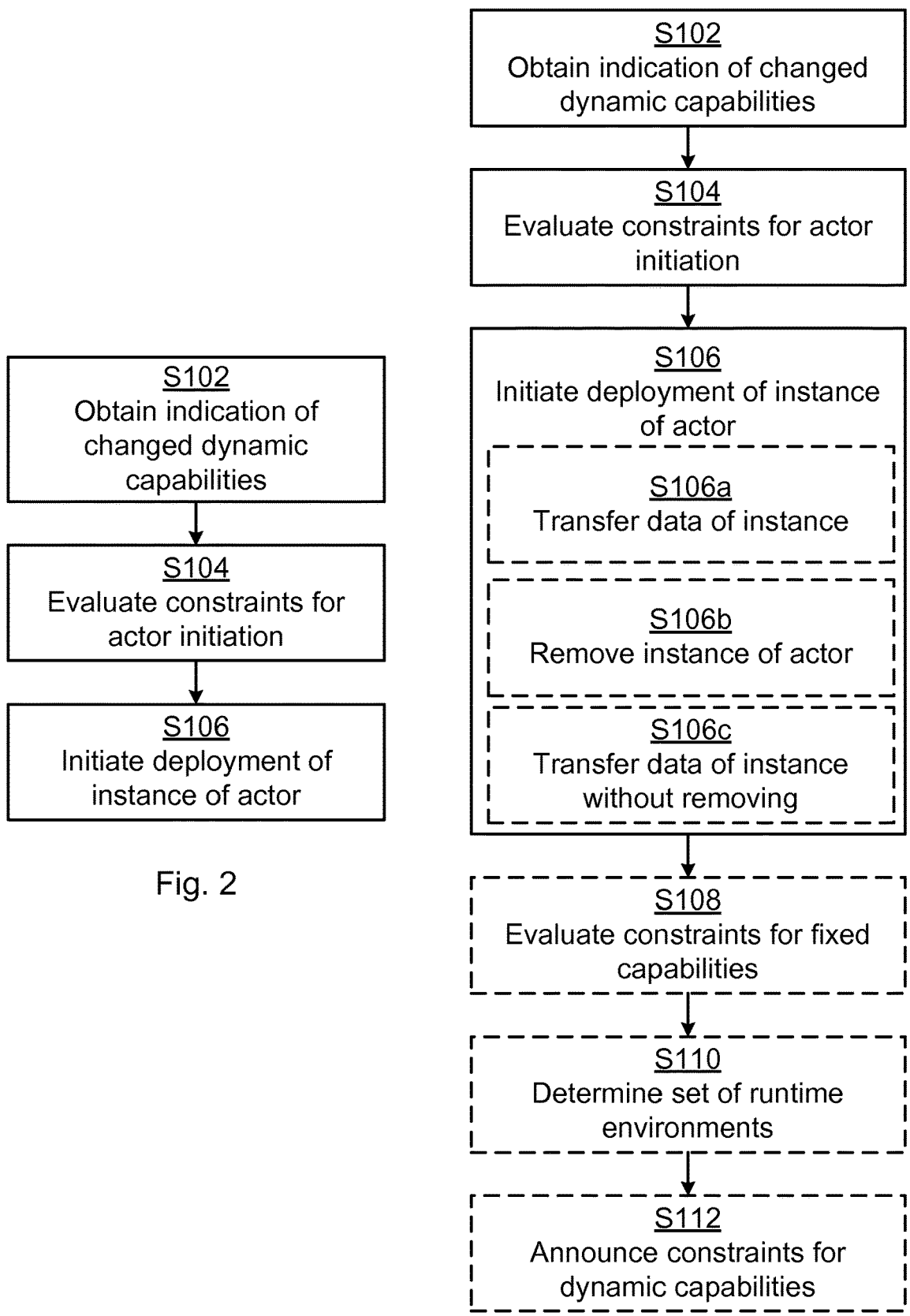

DEPLOYMENT OF ACTOR INSTANCES

TECHNICAL FIELD

Embodiments presented herein relate to a method, a runtime environment, a computer program, and a computer program product for initiating deployment of an instance of an actor. Embodiments presented herein further relate to a method, a runtime environment, a computer program, and a computer program product for deploying an instance of an actor.

BACKGROUND

In communications networks, there may be a challenge to obtain good performance and capacity for a given communications protocol, its parameters and the physical environment in which the communications network is deployed.

A runtime environment can allow application modules, denoted actors, to be deployed distributed over several devices (where each device comprises a runtime environment). In general terms, actors can be regarded as parts of a distributed application that communicate with messages, see http://arxiv.org/abs/1008.1459 (as accessed on 24 Oct. 2016). Actors have conditions to guide placement of an instance of the actor on a runtime environment. Runtime environments have attributes that describe the runtime environment functionality as well as other information.

Typically, small devices, such as machine-type communication (MTC) devices or Internet-of-Thing (IoT) devices, have fixed functions. This could be an issue for small devices that could be required to operate for decades with a requirement on functionality that evolves over time. For example, a small device in the form of a network equipped moisture sensor installed in a wall could have one required functionality during the building phase (e.g., to be configured to measure a (naturally occurring) relative high moisture level) and another required functionality during the building lifetime (e.g., to be configured to detect moisture that could indicate that a moisture barrier in the wall is not functioning properly).

Hence, two different types of small devices would be needed in this scenario; a first device in the form of a network equipped moisture sensor of a first type for use during the building phase, and a second device in the form of a network equipped moisture sensor of a second type for use during the building lifetime. Also other embedded devices than low-powered small devices commonly have fixed functions.

Thus, although runtime environments can be used to efficiently distribute actors over several such devices, it may still be cumbersome to use the devices for different functional purposes. In turn, this could make it cumbersome to deploy actor instances at the devices.

Hence, there is a need for an improved handling of deployment of actor instances.

SUMMARY

An object of embodiments herein is to provide efficient deployment of actor instances.

According to a first aspect there is presented a method for initiating deployment of an instance of an actor. The method is performed by a peer runtime environment. The method comprises obtaining an indication of changed dynamic capabilities of a first runtime environment. The method comprises evaluating, based on the changed dynamic capabilities, constraints for actor initiation at the first runtime environment. The method comprises initiating deployment of the instance of the actor at the first runtime environment when the constraints are met.

According to a second aspect there is presented a runtime environment acting as a peer runtime environment for initiating deployment of an instance of an actor. The runtime environment comprises processing circuitry. The processing circuitry is configured to cause the runtime environment to obtain an indication of changed dynamic capabilities of a first runtime environment. The processing circuitry is configured to cause the runtime environment to evaluate, based on the changed dynamic capabilities, constraints for actor initiation at the first runtime environment. The processing circuitry is configured to cause the runtime environment to initiate deployment of the instance of the actor at the first runtime environment when the constraints are met.

According to a third aspect there is presented a runtime environment acting as a peer runtime environment for initiating deployment of an instance of an actor. The runtime environment comprises processing circuitry and a storage medium. The storage medium stores instructions that, when executed by the processing circuitry, causes the runtime environment to perform operations, to or steps. The operations, or steps, cause the runtime environment to obtain an indication of changed dynamic capabilities of a first runtime environment. The operations, or steps, cause the runtime environment to evaluate, based on the changed dynamic capabilities, constraints for actor initiation at the first runtime environment. The operations, or steps, cause the runtime environment to initiate deployment of the instance of the actor at the first runtime environment when the constraints are met.

According to a fourth aspect there is presented a runtime environment acting as a peer runtime environment for initiating deployment of an instance of an actor. The runtime environment comprises an obtain module configured to obtain an indication of changed dynamic capabilities of a first runtime environment. The runtime environment comprises an evaluate module configured to evaluate, based on the changed dynamic capabilities, constraints for actor initiation at the first runtime environment. The runtime environment an initiate module configured to initiate deployment of the instance of the actor at the first runtime environment when the constraints are met.

According to a fifth aspect there is presented a computer program for initiating deployment of an instance of an actor, the computer program comprising computer program code which, when run on processing circuitry of a runtime environment acting as a peer runtime environment, causes the runtime environment to perform a method according to the first aspect.

According to a sixth aspect there is presented a method for deploying an instance of an actor. The method is performed by a first runtime environment. The method comprises announcing changed dynamic capabilities of the first runtime environment. The method comprises requesting evaluation of constraints for actor initiation at the first runtime environment from a peer runtime environment. The method comprises obtaining, as a response to the request and when the constraints are met, an indication to deploy the instance of the actor from the peer runtime environment.

According to a seventh aspect there is presented a runtime environment acting as a first runtime environment for deploying an instance of an actor. The runtime environment comprises processing circuitry. The processing circuitry is configured to cause the runtime environment to announce changed dynamic capabilities of the first runtime environment. The processing circuitry is configured to cause the runtime environment to request evaluation of constraints for actor initiation at the first runtime environment from a peer runtime environment. The processing circuitry is configured to cause the runtime environment to obtain, as a response to the request and when the constraints are met, an indication to deploy the instance of the actor from the peer runtime environment.

According to an eighth aspect there is presented a runtime environment acting as a first runtime environment for deploying an instance of an actor. The runtime environment comprises processing circuitry and a storage medium. The storage medium stores instructions that, when executed by the processing circuitry, causes the runtime environment to perform operations, or steps. The operations, or steps, cause the runtime environment to announce changed dynamic capabilities of the first runtime environment. The operations, or steps, cause the runtime environment to request evaluation of constraints for actor initiation at the first runtime environment from a peer runtime environment. The operations, or steps, cause the runtime environment to obtain, as a response to the request and when the constraints are met, an indication to deploy the instance of the actor from the peer runtime environment.

According to a ninth aspect there is presented a runtime environment acting as a first runtime environment for deploying an instance of an actor. The runtime environment comprises an announce module configured to announce changed dynamic capabilities of the first runtime environment. The runtime environment comprises a request module configured to request evaluation of constraints for actor initiation at the first runtime environment from a peer runtime environment. The runtime environment comprises an to obtain module configured to obtain, as a response to the request and when the constraints are met, an indication to deploy the instance of the actor from the peer runtime environment.

According to a tenth aspect there is presented a computer program for deploying an instance of an actor, the computer program comprising computer program code which, when run on processing circuitry of a runtime environment acting as a first runtime environment, causes the runtime environment to perform a method according to the sixth aspect.

According to an eleventh aspect there is presented a computer program product comprising a computer program according to at least one of the fifth aspect and the tenth aspect and a computer readable storage medium on which the computer program is stored. The computer readable storage medium could be a non-transitory computer readable storage medium.

Advantageously these methods, these runtime environments, and these computer programs provide efficient deployment of actor instances.

Advantageously these methods, these runtime environments, and these computer programs enable new application decided functionality, as defined by actor instances, to be executed and triggered based on application constraints and more specifically, actor constraints.

It is to be noted that any feature of the first, second, third, fourth, fifth, sixth seventh, eight, ninth, tenth and eleventh aspects may be applied to any other aspect, wherever appropriate. Likewise, any advantage of the first aspect may equally apply to the second, third, fourth, fifth, sixth, seventh, eight, ninth, tenth, and/or eleventh aspect, respectively, and vice versa. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which:

FIGS. 2-9 are flowcharts of methods according to embodiments;

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1:
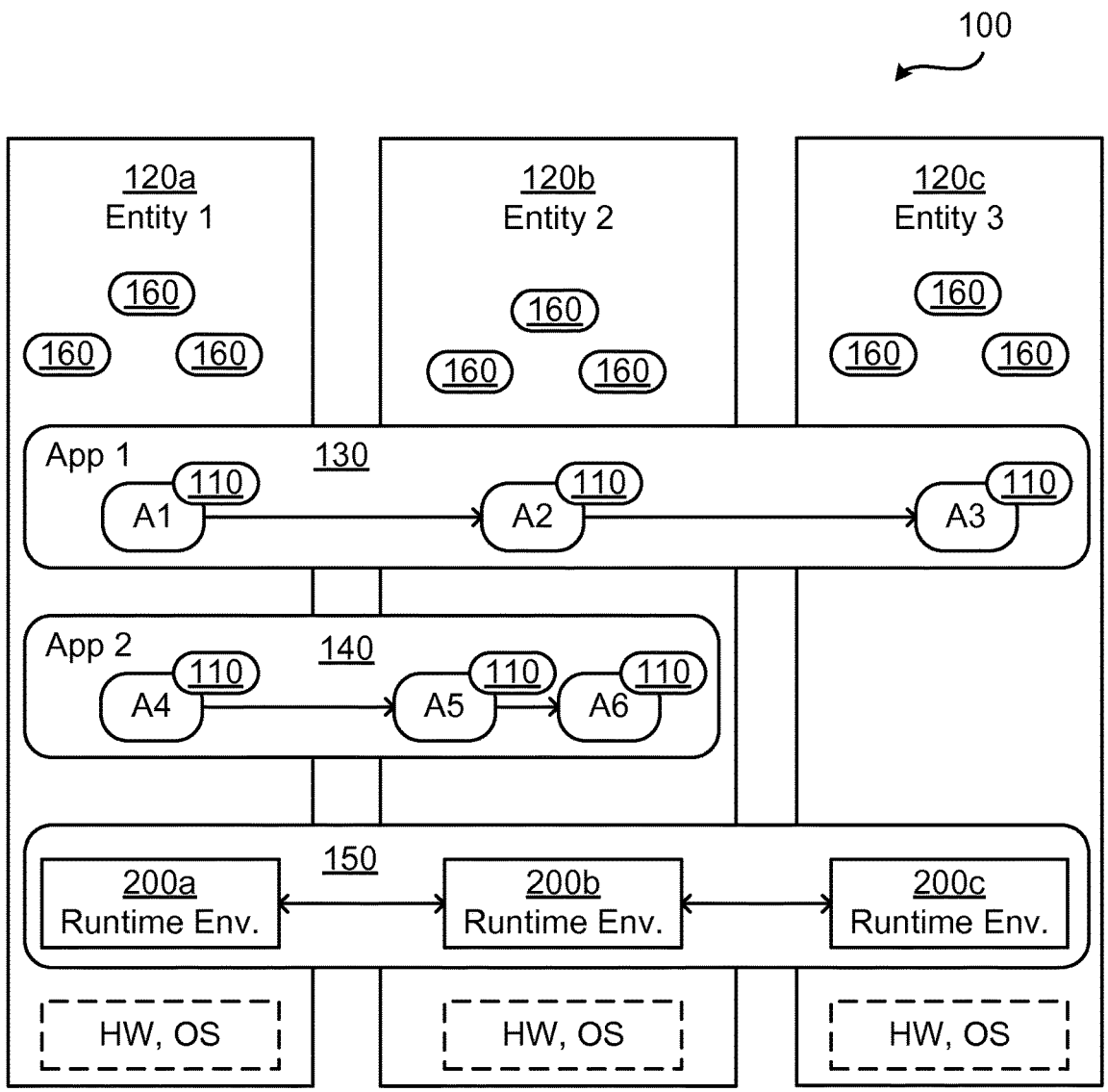
FIG. 1 is a schematic diagram illustrating a communications network according to embodiments.

FIG. 1 schematically illustrates a communications network 100. The communications network 100 comprises three entities (Entity 1, Entity 2, Entity 3) 120$a$, 120$b$, 120$c$, representing any combination of devices, compute nodes, and storage nodes. Each entity 120$a$. 120$b$, 120$c$ may have its own hardware (HW) and may have its own operating system (OS). Alternatively, hardware and/or operating system is shared among at least two of the entities 120$a$, 120$b$, 120$c$.

The entities 120$a$, 120$b$, 120$c$ host a first application (App 1) 130 and a second application (App 2) 140, each of which is distributed among the entities 120$a$, 120$b$, 120$c$. The applications 130, 140 are transparently distributed across the communications network 100 and comprise actors (A1, A2, A3, A4, A5, A6). There is not a one-to-one mapping between actors A1, A2, A3, A4, A5, A6 and entities 120$a$, 120$b$, 120$c$. For example, in the illustrative example of FIG. 1, actors A5 and A6 both reside on the same entity 120$b$ (i.e., Entity 2). The actors (A1, A2, A3, A4, A5, A6) may access a resource object 160 by means of at least one of the runtime environments 200$a$, 200$b$, 200$c$. Each resource object 160 could be a file system, a sensor, an actuator, a network interface, etc., that access is provided to by the runtime environments 200a, 200b, 200c.

The communications network 100 further comprises a distributed execution environment 150 formed by a set of network of runtime environments 200a, 200b, 200c, seen by the applications 130, 140 as a single platform.

Each actor A1, A2, A3, A4, A5, A6 can be run as one or more instances 110.

As disclosed above, small devices as well as embedded devices commonly have fixed functions. Runtime environments of such devices therefore announce their capabilities and attributes without any quality or functional information. Hence, constraints cannot be used to guide actor instance deployment based on such information. As with regards to the above-mentioned example, when a moisture sensor capability is announced, this announcement is made without information on accuracy or current reading.

The herein disclosed embodiments address this issue by being related to mechanisms for initiating deployment of an instance 110 of an actor A1, A2, A3, A4, A5, A6 of the application 130, 140 and to mechanisms for deploying an instance 110 of an actor A1, A2, A3, A4, A5, A6 of the application 130, 140.

Figure 4:
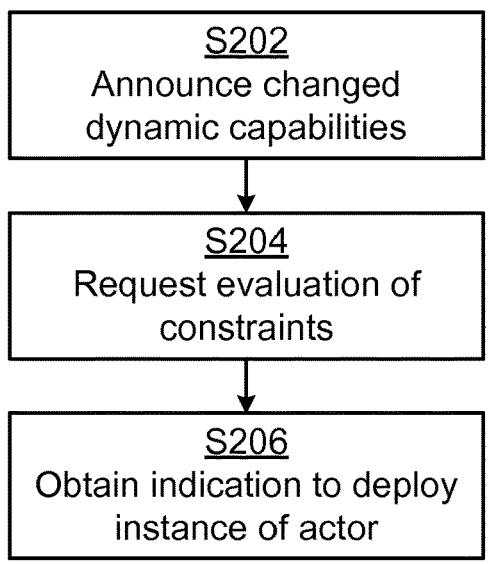
Figure 5:
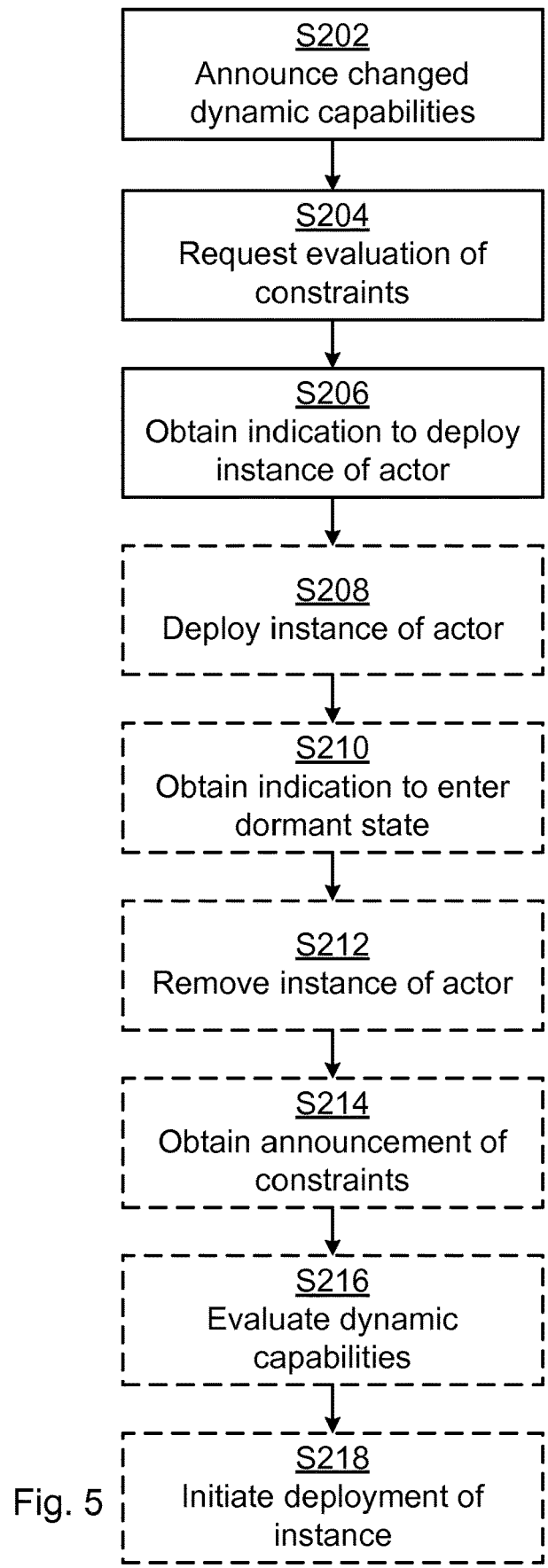

FIGS. 2 and 3 are flow charts illustrating embodiments of methods initiating deployment of an instance 110 of an actor A1, A2, A3, A4, A5, A6 of an application 130, 140 as performed by the runtime environment acting as a peer runtime environment 200b. FIGS. 4 and 5 are flow charts illustrating embodiments of methods for deploying an instance 110 of an actor A1, A2, A3, A4, A5, A6 of an application 130, 140 as performed by the runtime environment acting as a first runtime environment 200a. The methods are advantageously provided as computer programs 1220a, 1220b.

Reference is now made to FIG. 2 illustrating a method for initiating deployment of an instance 110 of an actor A1, A2, A3, A4, A5, A6 of an application 130, 140 as performed by the runtime environment acting as a peer runtime environment 200b according to an embodiment.

S108: The peer runtime environment 200b obtains an indication of changed dynamic capabilities of the first runtime environment 200a. Examples of dynamic capabilities will be provided below.

S110: The peer runtime environment 200b evaluates, based on the changed dynamic capabilities, constraints for actor initiation at the first runtime environment 200a.

S112: The peer runtime environment 200b initiates deployment of the instance 110 of the actor A1, A2, A3, A4, A5, A6 at the first runtime environment 200a when the constraints are met.

Dynamic capabilities are thereby matched with constraints that could trigger actor instance migration or replication.

Embodiments relating to further details of initiating deployment of an instance 110 of an actor A1, A2, A3, A4, A5, A6 of an application 130, 140 as performed by the runtime environment acting as a peer runtime environment 200b will now be disclosed.

The indication in step S108 could be obtained in an announcement from the first runtime environment 200a.

The instance 110 of the actor A1, A2, A3, A4, A5, A6 could remain in a shadow state until being deployed by the first runtime environment 200a. A shadow state is a non-operative (non-executing) mode of the actor instance.

Reference is now made to FIG. 3 illustrating methods for initiating deployment of an instance 110 of an actor A1, A2, A3, A4, A5, A6 of an application 130, 140 as performed by the runtime environment acting as a peer runtime environment 200b according to further embodiments. It is assumed that steps S102, S104, S106 are performed as described above with reference to FIG. 2 and a thus repeated description thereof is therefore omitted.

The instance 110 of the actor A1, A2, A3, A4, A5, A6 could either be migrated or replicated. For migration, necessary actor instance data is transferred from an originating runtime environment to the first runtime environment 200a, where the instance 110 of the actor A1, A2, A3, A4, A5, A6 is re-created, and it is removed from on the originating runtime environment. Hence, according to an embodiment the peer runtime environment 200b is configured to perform steps S106a, S106b when initiating deployment of the instance in step S106:

S106a: The peer runtime environment 200b transfers data of the instance 110 of the actor A1, A2, A3, A4, A5, A6 to the first runtime environment 200a from one of the peer runtime environment 200b and a further runtime environment 200c (i.e., transferring the data from the runtime environment being the originating runtime environment).

S106b: The peer runtime environment 200b removes the instance 110 of the actor A1, A2, A3, A4, A5, A6 at this one of the peer runtime environment 200b and the further runtime environment 200c (i.e., from the runtime environment being the originating runtime environment).

For example, steps S106a and S106b could be performed in a scenario where the further runtime environment 200c has the actor and the peer runtime environment 200b evaluates constraints and finds out that the current placement of the actor is not allowed (due to changed dynamic capabilities) and another possible placement of the actor exist (at the first runtime environment 200a).

For replication, the destructive step (i.e., step S106b) is not performed. The purpose of replication is to allow an actor to be instantiated on multiple devices, e.g. on all runtime environments for which constraints are met. Hence, according to an embodiment the peer runtime environment 200b is configured to perform step S106c when initiating deployment of the instance in step S106:

S106c: The peer runtime environment 200b transfers data of the instance 110 of the actor A1, A2, A3, A4, A5, A6 to the first runtime environment 200a from one of the peer runtime environment 200b and a further runtime environment 200c (i.e., from the runtime environment being the originating runtime environment) without removing the instance 110 of the actor A1, A2, A3, A4, A5, A6 at this one of the peer runtime environment 200b and the further runtime environment 200c (i.e., without removing the data from the runtime environment being the originating runtime environment).

For constraints that are used for replication, the announced constraints are only removed from the originating runtime environment after all necessary actor replicas have been created, whereas for actor instance migration this can be done after the first migration. However, if the instance is expected to continue migrate to other runtime environments, the constraint information could be kept at the originating runtime environment.

The data to be transferred in step S106c could be altered to allow several instances to execute, e.g. by giving them unique identifications. Hence, according to an embodiment at least part of the data is altered when being transferred to the first runtime environment 200a.

The constraints could be divided into (at least) two sets of constraints for each actor A1, A2, A3, A4, A5, A6; one set of constraints that is evaluated against fixed capabilities and another set which has constraints based on dynamic capabilities. Hence, according to an embodiment the peer runtime environment 200b is configured to perform steps S108, S110, S112:

S108: The peer runtime environment 200b evaluates constraints for fixed capabilities of the instance 110 of the actor A1, A2, A3, A4, A5, A6.

S110: The peer runtime environment 200b determines a set of runtime environments 200a, 200c to deploy the instance 110 of the actor A1, A2, A3, A4, A5, A6 to.

S112: The peer runtime environment 200b announces constraints for dynamic capabilities to the set of runtime environments 200a, 200c with a reference to the instance 110 of the actor A1, A2, A3, A4, A5, A6.

Constraints can be device specific (i.e., specific for a runtime environment) or application specific; device specific constraints relate to the runtime environment with the dynamic capability, whereas the application specific constraints originate with the deployment of the application. Hence, according to an embodiment the constraints are specific for at least one of the first runtime environment 200a and the application 130, 140 (i.e., for the first runtime environment 200a and/or the application 130, 140). In this respect, some constraints could only be evaluated on some specific runtime environments but they could be specified by the application 130, 140.

There could be different examples of dynamic capabilities. According to embodiments the dynamic capabilities are scalar-valued capabilities, discrete-valued capabilities, quality-valued capabilities, or non-functional capabilities. Each set of dynamic capabilities could have its own set of constraints. Hence, according to an embodiment each one of the scalar-valued capabilities, discrete-valued capabilities, quality-valued capabilities, and non-functional capabilities is associated with its own set of constraints. Some examples of dynamic capabilities and corresponding constraints are:

Scalar-valued capabilities: Temperature, speed, acceleration, direction, pressure. Set of constraints: Over/under a certain threshold, inside/outside interval, location, time.

Discrete-valued capabilities: Open/closed, on/off, true/false/unknown, ability to actuate, ability to unlock. Set of constraints: Changed state, specific state, activated.

Quality-valued capabilities: Possible frequency of sample/actuate, accuracy, ratio of false positives. Set of constraints: Lowest/highest value allowed, standard deviation, mean absolute deviation, variance.

Non-functional capabilities: Mean time between failures (MTBF), availability, reliability, processing load, network load, dynamic capability active period/count, manufacturer, identity, owner, or network operator. Set of constraints: Lowest/Highest value allowed, changed state (failure/available), when dynamic capability have been active for a period/number of times, whitelist, blacklist.

Reference is now made to FIG. 4 illustrating a method for deploying an instance 110 of an actor A1, A2, A3, A4, A5, A6 of an application 130, 140 as performed by the runtime environment acting as a first runtime environment 200a according to an embodiment.

As disclosed above, the peer runtime environment 200b in step S102 obtains an indication of changed dynamic capabilities. It is assumed that these changed dynamic capabilities are announced by the first runtime environment 200a. Hence the first runtime environment 200a is configured to perform step S202:

S202: The first runtime environment 200a announces changed dynamic capabilities of the first runtime environment 200a. Examples of dynamic capabilities have been given above.

S204: The first runtime environment 200a requests evaluation of constraints for actor initiation at the first runtime environment 200a from the peer runtime environment 200b.

As disclosed above, the peer runtime environment 200b in step S106 initiates deployment of the instance 110 of the actor A1, A2, A3, A4, A5, A6 at the first runtime environment 200a when the constraints are met. The initiation could by the first runtime environment 200a obtained as an indication. Hence the first runtime environment 200a is configured to perform step S206:

S206: The first runtime environment 200a obtains, as a response to the request and when the constraints are met, an indication to deploy the instance 110 of the actor A1, A2, A3, A4, A5, A6 from the peer runtime environment 200b.

Embodiments relating to further details of deploying an instance 110 of an actor A1, A2, A3, A4, A5, A6 of an application 130, 140 as performed by the runtime environment acting as a first runtime environment 200a will now be disclosed.

Reference is now made to FIG. 5 illustrating methods for deploying an instance 110 of an actor A1, A2, A3, A4, A5, A6 of an application 130, 140 as performed by the runtime environment acting as a first runtime environment 200a according to further embodiments. It is assumed that steps S202, S204, S206 are performed as described above with reference to FIG. 4 and a thus repeated description thereof is therefore omitted.

Once having obtained the indication to deploy the instance 110 of the actor A1, A2, A3, A4, A5, A6 the first runtime environment 200a could deploy the instance 110. Hence, according to an embodiment the first runtime environment 200a is configured to perform step S208 upon having obtained the indication in step S208:

S208: The first runtime environment 200a deploys the instance 110 of the actor A1, A2, A3, A4, A5, A6.

The instance 110 could then be removed when the first runtime environment 200a re-enters a dormant state. Dormant state could here be defined as a state of rest or inactivity; a state where the first runtime environment 200a is inoperative or abeyance. Hence, according to an embodiment the first runtime environment 200a is configured to perform steps S210 and S212:

S210: The first runtime environment 200a obtains an indication to enter a dormant state.

S212: The first runtime environment 200a, before entering the dormant state, removes the instance 110 of the actor A1, A2, A3, A4, A5, A6.

As disclosed above, according to an embodiment the peer runtime environment 200b in step S112 announces constraints for dynamic capabilities to the set of runtime environments 200a, 200c with a reference to the instance 110 of the actor A1, A2, A3, A4, A5, A6. Hence, according to an embodiment the first runtime environment 200a is configured to perform steps S214, S216, S218:

S214: The first runtime environment 200a obtains announcement of constraints for dynamic capabilities with a reference to the instance 110 of the actor A1, A2, A3, A4, A5, A6.

to S216: The first runtime environment 200a evaluates the dynamic capabilities against the constraints for dynamic capabilities.

Figure 6:
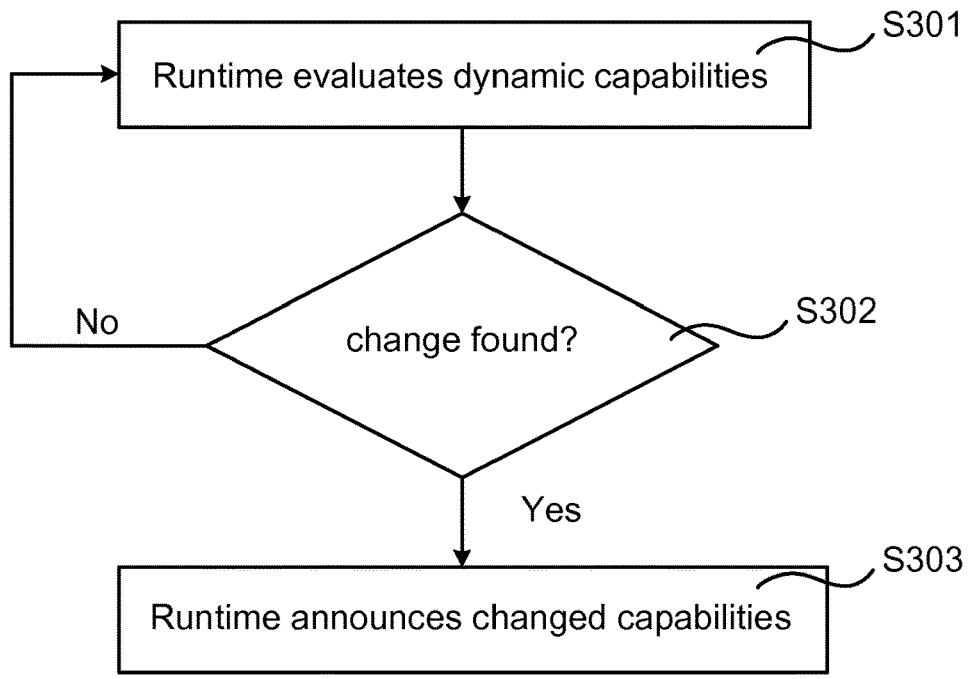

S218: The first runtime environment 200a initiates deployment of the instance 110 of the actor A1, A2, A3, A4, A5, A6 at the peer runtime environment 200b when the constraints are met One particular embodiment for evaluating and announcing dynamic capabilities based on at least some of the above disclosed embodiments will now be disclosed in detail with reference to the flow chart of FIG. 6.

S301: The first runtime environment 200a evaluates its dynamic capabilities. A change in dynamic capabilities could be triggered by a push event, such as a hardware interrupt that detects new data, or a threshold reading, or by a poll operation by the first runtime environment 200a e.g. when the first runtime environment 200a is awake or at a regular interval.

S302: If a change of the dynamic capabilities is found, then step S303 is entered. Else, step S301 is entered again, possible after some time delay.

S303: The first runtime environment 200a announces at least the changed dynamic capabilities. One way to implement step S303 is to perform step S202. The first runtime environment 200a could announce changed dynamic capabilities to the peer runtime environment 200b and, potentially, to a central database. The announcement could be local to the entity 120a when actor instance constraints are stored locally to save network transfer resources and to support local constraints matching in the entity 120a, such as in the first runtime environment 200a.

Figure 7:
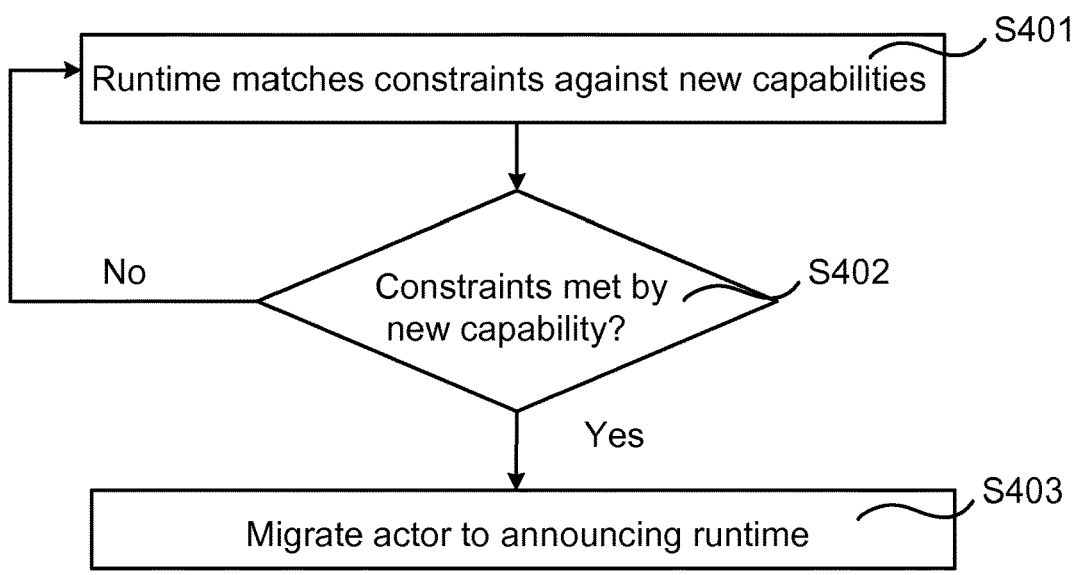

One particular embodiment for deploying an instance 110 of an actor A1, A2, A3, A4, A5, A6 based on at least some of the above disclosed embodiments will now be disclosed in detail with reference to the flow chart of FIG. 7.

S401: The peer runtime environment 200b matches constraints to new dynamic capabilities by evaluating, based on the changed dynamic capabilities, constraints for actor initiation at the first runtime environment 200a. One way to implement step S401 is to perform step S104.

S402: If the constraints are met, then step S403 is entered. Else, step S401 is entered, possible after some time delay, including information that step S401 is triggered for new dynamic capabilities.

S403: The peer runtime environment 200b initiates deployment of the instance 110 of the actor A1, A2, A3, A4, A5, A6 at the first runtime environment 200a. One way to implement step S403 is to perform step S106. The peer runtime environment 200b thus migrates or replicates the instance 110 to the first runtime environment 200a when constraints are met.

Figure 8:
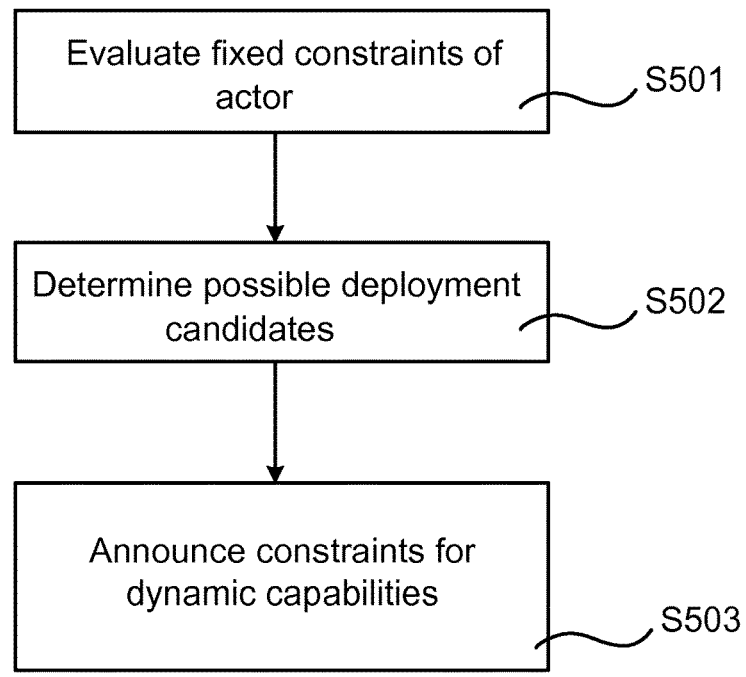

One particular embodiment for announcing constraints for dynamic capabilities based on at least some of the above disclosed embodiments will now be disclosed in detail with reference to the flow chart of FIG. 8.

S501: The peer runtime environment 200b evaluates constraints for fixed capabilities of the instance 110 of the actor A1, A2, A3, A4, A5, A6. One way to implement step S501 is to perform step S108.

S502: The peer runtime environment 200b determines possible deployment candidates by determining a set of runtime environments 200a, 200c to deploy the instance 110 of the actor A1, A2, A3, A4, A5, A6 to. One way to implement step S502 is to perform step S110.

S503: The peer runtime environment 200b announces the constraints for dynamic capabilities to the deployment candidates by announcing constraints for dynamic capabilities to the set of runtime environments 200a, 200c with a reference to the instance 110 of the actor A1, A2, A3, A4, A5, A6. One way to implement step S503 is to perform step S112.

Figure 9:
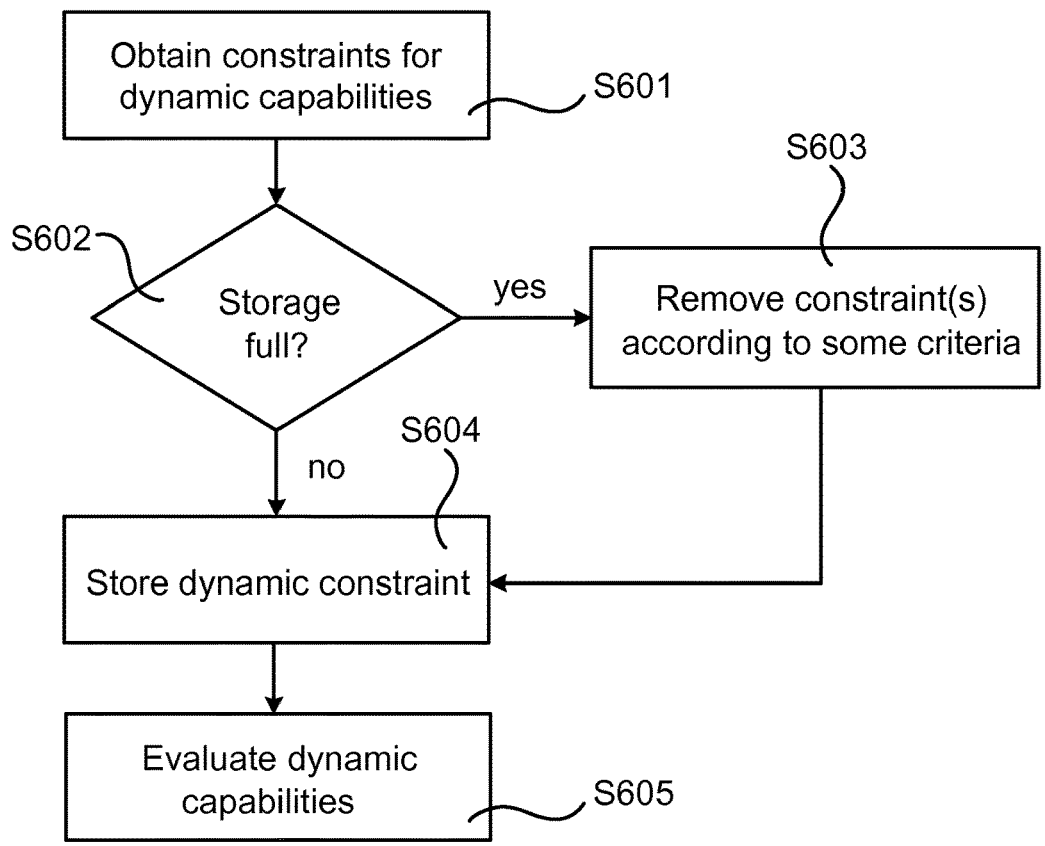

One particular embodiment for storing constraints based on at least some of the above disclosed embodiments will now be disclosed in detail with reference to the flow chart of FIG. 9.

S601: The first runtime environment 200a and/or the peer runtime to environment 200b obtain(s) constraints for dynamic capabilities.

S602: If the storage of constraints is full, step S603 is entered. Else, step S604 is entered.

S603: Previously stored constraints are removed from the storage of constraints.

S604: The obtained constraints are stored in the storage of constraints for later evaluation.

S605: The first runtime environment 200a and/or the peer runtime environment 200b evaluate(s), based on the obtained constraints for dynamic capabilities, the obtained constraints for actor initiation at the first runtime environment 200a. One way to implement step S605 is to perform step S104.

Figure 10:
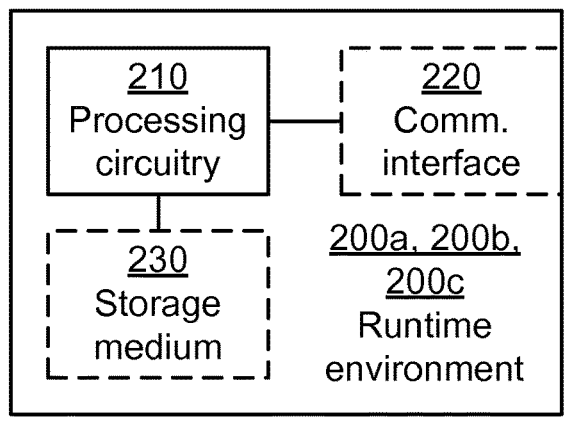
FIG. 10 is a schematic diagram showing functional units of a runtime environment according to an embodiment.

FIG. 10 schematically illustrates, in terms of a number of functional units, the components of a runtime environment 200a, 200b, 200c according to an embodiment. According to aspects, the runtime environment 200a, 200b, 200c is configured to act as at least one of a peer runtime environment 200b and a first runtime environment 200a.

Processing circuitry 210 is provided using any combination of one or more of a suitable central processing unit (CPU), multiprocessor, microcontroller, digital signal processor (DSP), etc., capable of executing software instructions stored in a computer program product 1210a (as in FIG. 12), e.g. in the form of a storage medium 230. The processing circuitry 210 may further be provided as at least one application specific integrated circuit (ASIC), or field programmable gate array (FPGA).

Particularly, the processing circuitry 210 is configured to cause the runtime environment 200a, 200b, 200c to perform a set of operations, or steps, S102-S112, S202-S214, as disclosed above. For example, the storage medium 230 may store the set of operations, and the processing circuitry 210 may be to configured to retrieve the set of operations from the storage medium 230 to cause the runtime environment 200a, 200b, 200c to perform the set of operations. The set of operations may be provided as a set of executable instructions. Thus the processing circuitry 210 is thereby arranged to execute methods as herein disclosed.

The storage medium 230 may also comprise persistent storage, which, for example, can be any single one or combination of magnetic memory, optical memory, solid state memory or even remotely mounted memory.

The runtime environment 200a, 200b, 200c may further comprise a communications interface 220 for communications at least with another runtime environment 200a, 200b, 200c. As such the communications interface 220 may comprise one or more transmitters and receivers, comprising analogue and digital components.

The processing circuitry 210 controls the general operation of the runtime environment 200a, 200b, 200c e.g. by sending data and control signals to the communications interface 220 and the storage medium 230, by receiving data and reports from the communications interface 220, and by retrieving data and instructions from the storage medium 230. Other components, as well as the related functionality, of the runtime environment 200a, 200b, 200c are omitted in order not to obscure the concepts presented herein.

Figure 11:
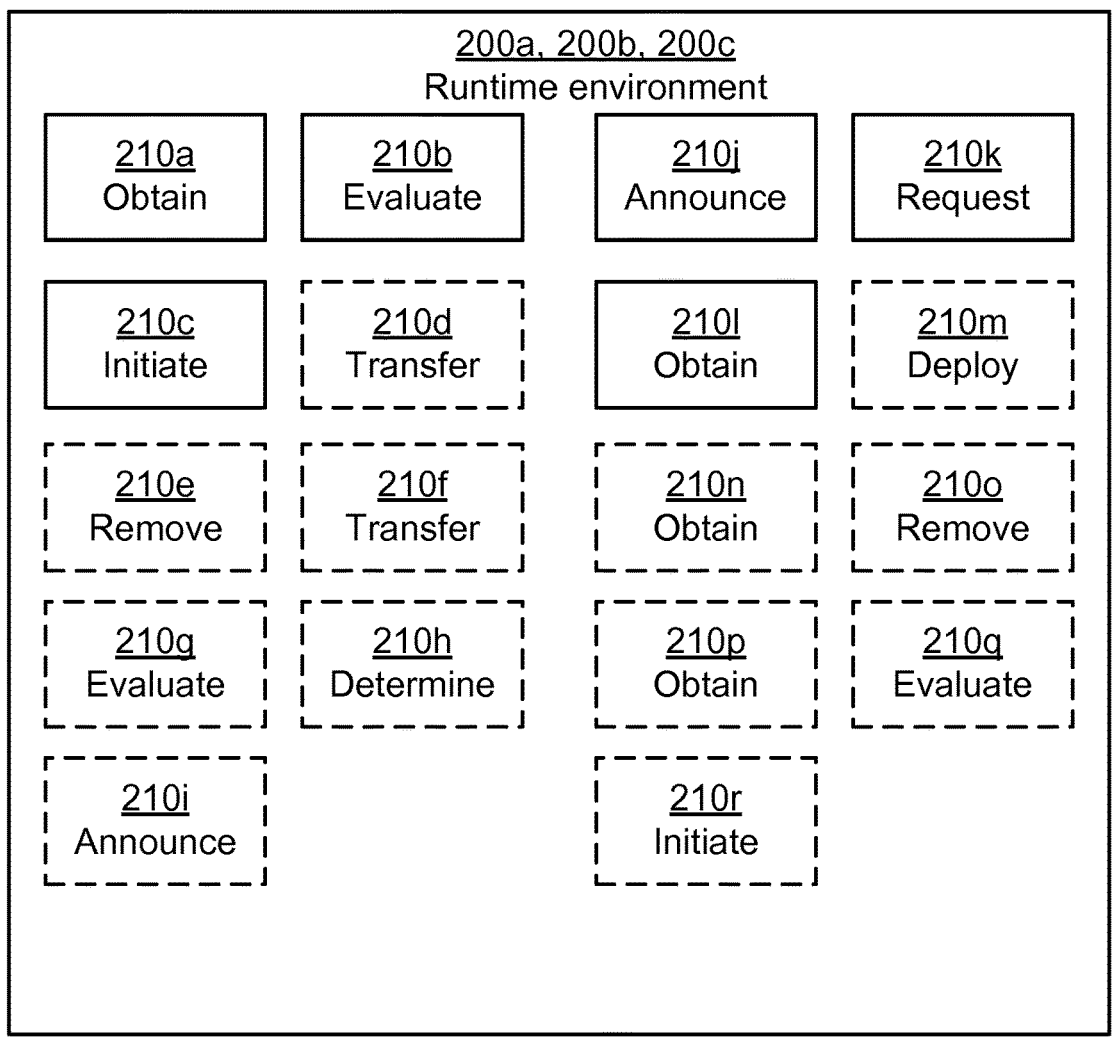
FIG. 11 is a schematic diagram showing functional modules of a runtime environment according to an embodiment.

FIG. 11 schematically illustrates, in terms of a number of functional modules, the components of a runtime environment 200a, 200b, 200c according to an embodiment. The runtime environment 200a, 200b, 200c of FIG. 11 comprises a number of functional modules.

In order for the runtime environment to act as a peer runtime environment 200b the runtime environment comprises an obtain module 210a configured to perform step S102, an evaluate module 210b configured to perform step S104, and an initiate module 210c configured to perform step S106. The runtime environment acting as a peer runtime environment 200b may further comprise a number of optional functional modules, such as any of a transfer module 210d configured to perform step S106a, a remove module 210e configured to perform step S106b, a transfer module 210f configured to perform step S06c, an evaluate module 210g configured to perform step S108, a determine module 210h configured to perform step S110, and an announce module 210i configured to perform step S112.

In order for the runtime environment to act as a first runtime environment 200a the runtime environment comprises an announce module 210j configured to perform step S202, a request module 210l configured to perform step S204, and an obtain module 210l configured to perform step S206. The runtime environment acting as a first runtime environment 200a may further comprise a number of optional functional modules, such as any of a deploy module 210m configured to perform step S208, an obtain module 210n configured to perform step S110, a remove module 210o configured to perform step S112, an obtain module 210p configured to perform step S214, an evaluate module 210q configured to perform step S216, and an initiate module 210r configured to perform step S218.

In general terms, each functional module 210a-210r may be implemented in hardware or in software. Preferably, one or more or all functional modules 210a-210r may be implemented by the processing circuitry 210, possibly in cooperation with functional units 220 and/or 230. The processing circuitry 210 may thus be arranged to from the storage medium 230 fetch instructions as provided by a functional module 210a-210r and to execute these instructions, thereby performing any steps of the runtime environment 200a, 200b, 200c as disclosed herein.

Figure 12:
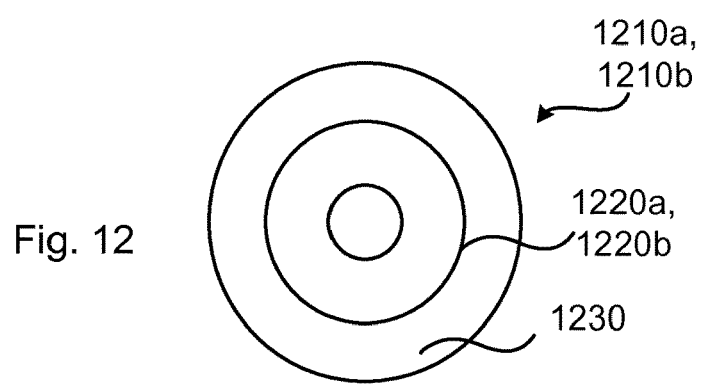
FIG. 12 shows one example of a computer program product comprising computer readable means according to an embodiment.

FIG. 12 shows one example of a computer program product 1210a, 1210b comprising computer readable means 1230. On this computer readable means 1230, a computer program 1220a can be stored, which computer program 1220a can cause the processing circuitry 210 and thereto operatively coupled entities and devices, such as the communications interface 220 and the storage medium 230, to execute methods according to embodiments described herein. The computer program 1220a and/or computer program product 1210a may thus provide means for performing any steps of the runtime environment to act as a peer runtime environment 200b as herein disclosed. On this computer readable means 1230, a computer program 1220b can be stored, which computer program 1220b can cause the processing circuitry 310 and thereto operatively coupled entities and devices, such as the communications interface 320 and the storage medium 330, to execute methods according to embodiments described herein. The computer program 1220b and/or computer program product 1210b may thus provide means for performing any steps of the runtime environment to act as a first runtime environment 200a as herein disclosed.

In the example of FIG. 12, the computer program product 1210a, 1210b is illustrated as an optical disc, such as a CD (compact disc) or a DVD (digital versatile disc) or a Blu-Ray disc. The computer program product 1210a, 1210b could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 1220a, 1220b is here schematically shown as a track on the depicted optical disk, the computer program 1220a, 1220b can be stored in any way which is suitable for the computer program product 1210a, 1210b.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for initiating deployment of an instance of an actor, the method being performed by a peer runtime environment, the method comprising:
   obtaining an indication of changed dynamic capabilities of a first runtime environment;
   evaluating, based on the changed dynamic capabilities, constraints for actor initiation at the first runtime environment; and
   initiating deployment of the instance of the actor at the first runtime environment when the constraints are met,
   wherein the changed dynamic capabilities include a changed quality-valued capability.

2. The method according to claim 1, further comprising:
   evaluating constraints for fixed capabilities of the instance of the actor;
   determining a set of runtime environments to deploy the instance of the actor to; and
   announcing constraints for dynamic capabilities to the set of runtime environments with a reference to the instance of the actor.

3. The method according to claim 1, wherein the indication is obtained in an announcement from the first runtime environment.

4. The method according to claim 1, wherein the instance of the actor remains in a shadow state until being deployed by the first runtime environment.

5. The method according to claim 1, wherein initiating deployment of the instance comprises:
   transferring data of the instance of the actor to the first runtime environment from one of the peer runtime environment and a further runtime environment; and
   removing the instance of the actor at said one of the peer runtime environment and the further runtime environment.

6. The method according to claim 1, wherein initiating deployment of the instance comprises:
   transferring data of the instance of the actor to the first runtime environment from one of the peer runtime environment and a further runtime environment without removing the instance of the actor at said one of the peer runtime environment and the further runtime environment.

7. The method according to claim 6, wherein at least part of the data is altered when being transferred to the first runtime environment.

8. The method according to claim 1, wherein the constraints are specific for at least one of the first runtime environment and an application.

9. The method according to claim 1, wherein the dynamic capabilities are scalar-valued capabilities, discrete-valued capabilities, quality-valued capabilities, or non-functional capabilities.

10. The method according to claim 9, wherein each one of the scalar-valued capabilities, discrete-valued capabilities, quality-valued capabilities, and non-functional capabilities is associated with its own set of constraints.

11. A method for deploying an instance of an actor, the method being performed by a first runtime environment, the method comprising:
announcing changed dynamic capabilities of the first runtime environment;
requesting evaluation of constraints for actor initiation at the first runtime environment from a peer runtime environment; and
obtaining, as a response to the request and when the constraints are met, an indication to deploy the instance of the actor from the peer runtime environment,
wherein the changed dynamic capabilites include a changed quality-valued capability.

12. The method according to claim 11, further comprising:
obtaining announcement of constraints for dynamic capabilities with a reference to the instance of the actor; and
evaluating the dynamic capabilities against the constraints for dynamic capabilities; and
initiating deployment of the instance of the actor at the peer runtime environment when the constraints are met.

13. The method according to claim 11, further comprising, upon having obtained the indication:
deploying the instance of the actor.

14. The method according to claim 13, further comprising:
obtaining an indication to enter a dormant state; and before entering the dormant state:
removing the instance of the actor.

15. A runtime environment acting as a peer runtime environment for initiating deployment of an instance of an actor, the runtime environment comprising processing circuitry, the processing circuitry being configured to cause the runtime environment to:
obtain an indication of changed dynamic capabilities of a first runtime environment;
evaluate, based on the changed dynamic capabilities, constraints for actor initiation at the first runtime environment; and
initiate deployment of the instance of the actor at the first runtime environment when the constraints are met,
wherein the changed dynamic capabilities include a changed quality-valued capability.

16. A runtime environment acting as a peer runtime environment for initiating deployment of an instance of an actor, the runtime environment comprising:
processing circuitry; and
a storage medium storing instructions that, when executed by the processing circuitry, causes the runtime environment to:
obtain an indication of changed dynamic capabilities of a first runtime environment;
evaluate, based on the changed dynamic capabilities, constraints for actor initiation at the first runtime environment; and
initiate deployment of the instance of the actor at the first runtime environment when the constraints are met,
wherein the changed dynamic capabilities include a changed quality-valued capability.

17. A runtime environment acting as a peer runtime environment for initiating deployment of an instance of an actor, the runtime environment comprising:
an obtain module configured to obtain an indication of changed dynamic capabilities of a first runtime environment;
an evaluate module configured to evaluate, based on the changed dynamic capabilities, constraints for actor initiation at the first runtime environment; and
an initiate module configured to initiate deployment of the instance of the actor at the first runtime environment when the constraints are met,
wherein the changed dynamic capabilities include one or more of:
a changed quality-valued capability.

18. A runtime environment acting as a first runtime environment for deploying an instance of an actor, the runtime environment comprising processing circuitry, the processing circuitry being configured to cause the runtime environment to:
announce changed dynamic capabilities of the first runtime environment;
request evaluation of constraints for actor initiation at the first runtime environment from a peer runtime environment; and
obtain, as a response to the request and when the constraints are met, an indication to deploy the instance of the actor from the peer runtime environment,
wherein the changed dynamic capabilities include a changed quality-valued capability.

19. A runtime environment acting as a first runtime environment for deploying an instance of an actor, the runtime environment comprising:
processing circuitry; and
a storage medium storing instructions that, when executed by the processing circuitry, causes the runtime environment to:
announce changed dynamic capabilities of the first runtime environment;
request evaluation of constraints for actor initiation at the first runtime environment from a peer runtime environment; and
obtain, as a response to the request and when the constraints are met, an indication to deploy the instance of the actor from the peer runtime environment,
wherein the changed dynamic capabilities include a changed quality-valued capability.

20. A runtime environment acting as a first runtime environment for deploying an instance of an actor, the runtime environment comprising:
an announce module configured to announce changed dynamic capabilities of the first runtime environment;
a request module configured to request evaluation of constraints for actor initiation at the first runtime environment from a peer runtime environment; and
an obtain module configured to obtain, as a response to the request and when the constraints are met, an indication to deploy the instance of the actor from the peer runtime environment, wherein the changed dynamic capabilities include
a changed quality-valued capability.

21. A non-transitory computer readable medium comprising a computer program for initiating deployment of an instance of an actor, the computer program comprising computer code which, when run on processing circuitry of a runtime environment acting as a peer runtime environment, causes the runtime environment to:
- obtain an indication of changed dynamic capabilities of a first runtime environment;
- evaluate, based on the changed dynamic capabilities, constraints for actor initiation at the first runtime environment; and
- initiate deployment of the instance of the actor at the first runtime environment when the constraints are met,
- wherein the changed dynamic capabilities include a changed quality-valued capability.

22. A non-transitory computer readable medium comprising a computer program for deploying an instance of an actor, the computer program comprising computer code which, when run on processing circuitry of a runtime environment acting as a first runtime environment, causes the runtime environment to:
- announce changed dynamic capabilities of the first runtime environment;
- request evaluation of constraints for actor initiation at the first runtime environment from a peer runtime environment; and
- obtain, as a response to the request and when the constraints are met, an indication to deploy the instance of the actor from the peer runtime environment,
- wherein the changed dynamic capabilities include a changed quality-valued capability.

* * * * *